United States Patent [19]
Fabiano

[11] 3,759,538
[45] Sept. 18, 1973

[54] GARDEN KADDY

[76] Inventor: Anthony J. Fabiano, Bridgehampton Tnpk., Sag Harbor, N.Y. 11963

[22] Filed: Dec. 10, 1971

[21] Appl. No.: 208,048

[52] U.S. Cl. ......... 280/47.35, 280/47.37, 211/60 T
[51] Int. Cl. ............................................. B62b 3/10
[58] Field of Search ...................... 280/47.35, 79.2, 280/79.3, 47.11, 47.37; 211/60 T, 65, 126; 108/27, 28

[56] References Cited
UNITED STATES PATENTS

| | | | |
|---|---|---|---|
| 3,145,031 | 8/1964 | Wilkinson | 280/47.35 |
| 337,767 | 3/1886 | House | 211/65 |
| 806,365 | 12/1905 | Raisbeck | 280/47.34 |
| 1,854,777 | 4/1932 | Bales | 211/126 |
| 3,042,384 | 7/1962 | Bauman | 280/79.2 |
| 2,623,642 | 12/1952 | Looney | 280/79.3 |

Primary Examiner—Kenneth H. Betts
Assistant Examiner—Robert R. Song
Attorney—John J. Byrne

[57] ABSTRACT

A mobile storage facility having means for safely and conveniently supporting a wide range of garden implements, accessories and supplies.

4 Claims, 3 Drawing Figures

GARDEN KADDY

A principal objective of this invention is to provide a trailer for the efficient conveyance of garden tools and also to provide AC and DC portable power tools with power sources from said trailer. Additionally, a main objective of this invention is to provide convenient means for storing liquid fertilizer and insecticides and the spraying apparatus therefor.

Another important objective of this invention is to provide a carrier for garden tools which is constructed of weather-resistant materials such as anodized aluminum and/or painted steel which will remain aesthetically appealing throughout its useful life.

A still further objective of this invention is to provide a rugged garden carrier of a type which is maneuverable, resistant to tipping, and which is readily connected to a towing vehicle.

Another important objective of this invention is to provide means for pivotally mounting the front wheels of garden tool carriers in a manner permitting only a limited amount of turn so as to diminish the chance of tipping when the trailer is subjected to unusual loading or is on uneven terrain.

Another important objective of this invention is to provide conveniently located trays for storing tools having unusual shapes which are difficult to store.

A still further objective of this invention is to provide a safe storage means for long-handled tools which provides easy accessibility without sacrificing safety.

Another objective of the invention is to provide means for completely grounding the trailer so that the AC and DC power tools using the trailer as a power source will not create a safety hazard.

Another objective is to provide an axial pivot for the steering means which will not require periodic lubrication.

Another important objective of the invention is to provide a wide-stanced wheel base and wide-tread tires for providing good traction when the trailer is towed. The carrier is also designed with a view toward lightness, compactness, and durability without sacrificing strength and maneuverability.

A still further objective of the invention is to provide means to support "J" hooks under the aforementioned side trays such that small hand tools are readily stored for easy accessibility.

Another important objective of the invention is to provide a carrier of the type described wherein the horizontal framing members also serve as storage areas.

Another important objective of this invention is to provide a convenient handle for towing the carrier either manually or with a towing vehicle.

These and other objects of the invention will become more apparent to those skilled in the art by reference to the following detailed description when viewed in light of the accompanying drawings wherein.

Figure 1:
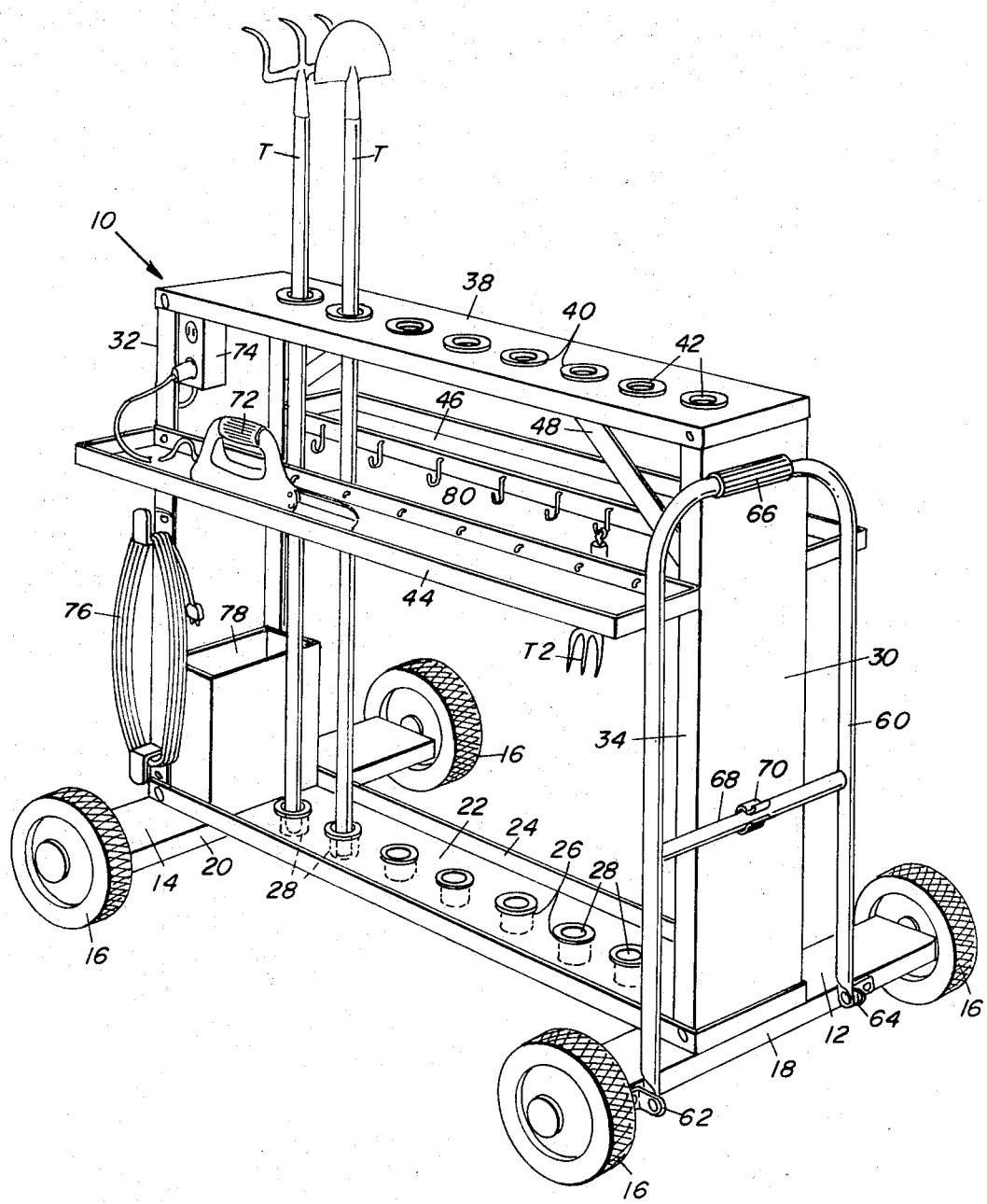
FIG. 1 is a perspective view of the invention with the handle means in its nested position.

Turning now to the drawings wherein like numerals indicate like parts, the numeral 10 indicates the carrier of this invention. The carrier is supported by a front ground-engaging element 12 and a rear ground-engaging element 14. The elements 12 and 14 have wheels 16 conventionally mounted at either end thereof. The wheels 16 are of a wide-tread, lightweight variety. The elements 12 and 14 are respectively formed with downward flanges 18 and 20 to provide a degree of rigidity.

Extending between the members 12 and 14 is a lower frame 22 having an upward lip or flange 24 about its periphery. Along its length, the frame 22 is formed with a series of apertures 26 which receive a series of plastic cup-shaped members 28. As will be seen hereinafter, the cup-shaped members retain the ends of long-handled tools.

Secured to the front portion of the lower frame 22 is a front vertical frame 30. Secured to the rear of the lower frame 22 is a rear vertical frame member 32. The front vertical frame is respectively provided with flange 34 about its periphery. Across the top of the front and rear frames 30, 32 is an upper frame member 38 having a series of apertures 40 spaced vertically above each of the apertures 26 in the lower frame member 22. A plastic, annular member 42 lines each of these apertures.

For added convenience and rigidity, a pair of side trays 44 and 46 are secured horizontally and intermediate the length of the front and rear frames. The entire framework is made increasingly rigid by way of bracing members such as those indicated by the numeral 48. As is conventional in sheet metal apparatus, the components are conveniently secured by nut and lock bolt assemblies as shown but unnumbered.

The rear ground-engaging assembly 14 is rigidly secured to the lower framework 22 by a series of bolts. However, the front ground-engaging assembly 12 is secured to the framework by way of a pivot pin 50 having pins 52 and 54 which engage slots 56 and 58 of member 12. The slots permit the element 12 to make approximately a 30° turn in either direction. A tubular handle member 60 is pivotally secured to the front ground-engaging member 12 by way of the brackets 62 and 64. At its looped end, the handle is equipped with a rubber grip 66. Intermediate the length of the handle member is a crossbrace 68 adapted for engagement by a spring clip 70 which is secured to the front vertical frame 30. This permits the handle to be nested against the carrier when not in use.

Figure 2:
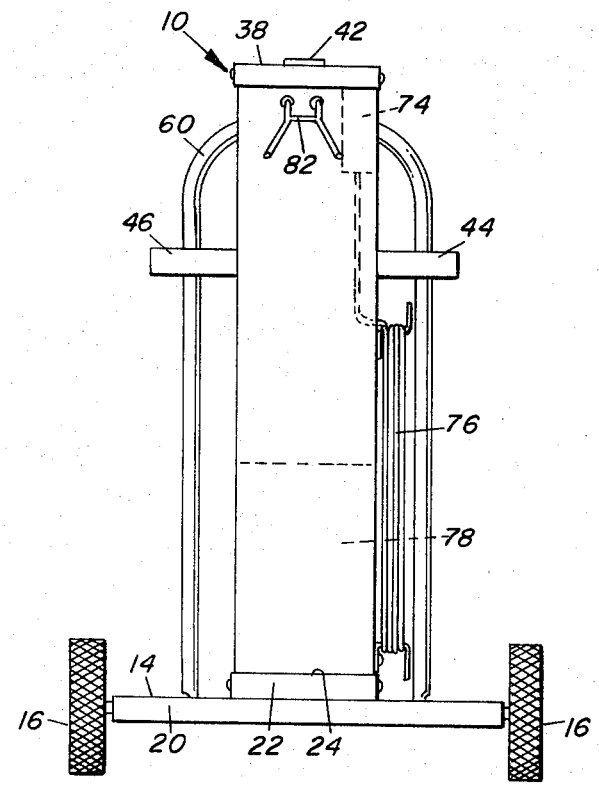
FIG. 2 is a rear elevation showing the apparatus of FIG. 1.
Figure 3:
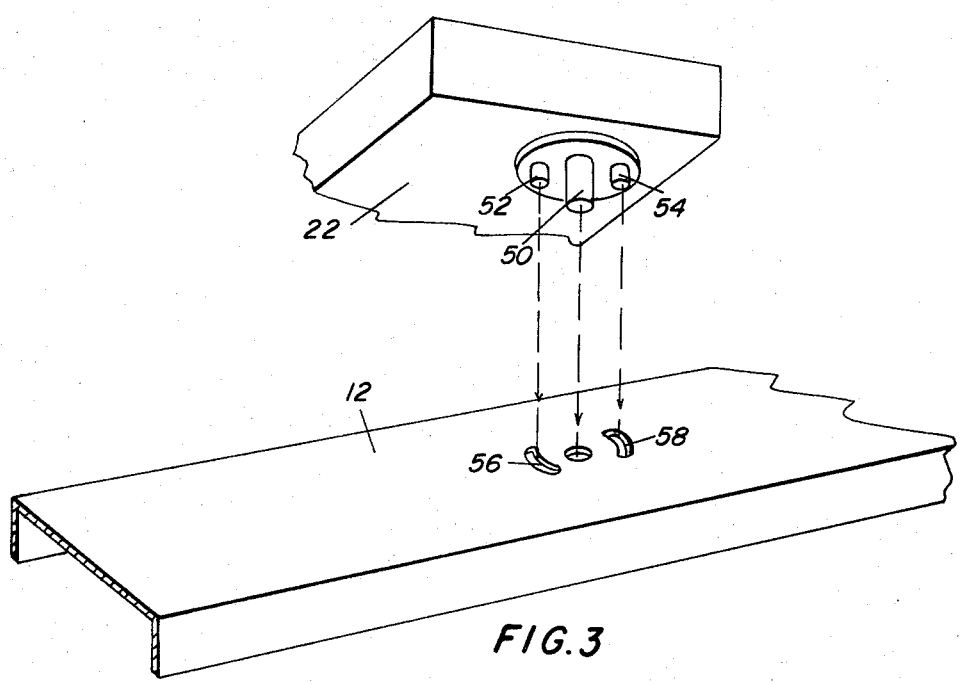
FIG. 3 is an exploded perspective of the steering limit means.

As seen best in FIG. 2, a plurality of long-handled tools T can be inserted through the annular plastic rings 40 with the handle end received by the cup member 28. Stored in this fashion, the tools are unlikely to be damaged and are available for ready use but are snugly and noiselessly stored within the carrier. The trays 44 can be utilized to store awkward equipment such as that exemplified by the electric shears 72. Another important feature of the invention is in the provision of an electric, waterproof receptacle 74 which is prewired to an electrical conduit 76. Also in the area in front of the rear vertical frame 32, a tank 78 for insecticides, pesticides, or the like, can be stored. Provisions are made along the inner lips of trays 44 to receive "J" hooks 80. The "J" hooks are used to support smaller hand tools such as those indicated by the letter T2.

The rear end frame has holes punched two inches from the top thereof. These holes will accept a hanger 82 so that a short handle D-shovel or fork can be carried as shown.

There has been described a carrier which can conveniently and efficiently store a great many tools in an efficient and compact manner. The apparatus is pitresistant and sturdy and, because of its wide wheel base, tip-resistant.

In a general manner, while there has been disclosed an effective and efficient embodiment of the invention, it should be well understood that the invention is not limited to such an embodiment as there might be changes made in the arrangement, disposition, and form of the parts without departing from the principle of the present invention.

I claim:

1. A mobile storage facility comprising, a lower frame having front and rear portions, a substantially vertical front frame rigidly connected to said front portion, a substantially vertical rear frame rigidly connected to said rear portion, a pair of storage trays secured on opposite sides of said front and rear frames and extending horizontally therebetween, front and rear ground-engaging elements respectively secured below said front and rear portions, a pivot means including a bolt extending through said front portion and said ground-engaging element, said pivot means further including a pair of pins respectively engageable in a pair of finite length slots in said front ground-engaging element for limiting the arc of pivot of said ground-engaging element, a handle pivotable about a horizontal axis connected to said front ground-engaging element, a clip on said front member to releasably secure said handle to said front frame, an upper frame secured at its front and rear end to the upper end of said front and rear vertical frame, respectively, having a first series of apertures formed therein, said lower frame having a second series of corresponding apertures vertically below said first series of apertures, and plastic cups in each aperture of said second series whereby a tool handle inserted through an aperture of said first series can have one end thereof supported by the plastic cup in said aperture immediately below.

2. The invention of claim 1 wherein a power cable is carried by said facility, one end of which terminates in a weatherproof receptacle on said front frame.

3. The invention of claim 2 wherein a DC battery charger pack is mounted adjacent said receptacle and wired thereto.

4. The invention of claim 3 wherein a storage tank and spray attachment is mounted on said lower frame.

* * * * *